United States Patent [19]
Gordon et al.

[11] 3,821,814
[45] June 28, 1974

[54] APPARATUS FOR PROVIDING INDIVIDUAL ADJUSTMENT OF MOVABLE MULTIPLE TRANSDUCERS IN A PLURAL TAPE CARTRIDGE PLAYER

[75] Inventors: Franklin Gordon, Zionsville; Dallas Roy Andrews, Kirklin, both of Ind.

[73] Assignee: RCA Corporation, New York, N.Y.

[22] Filed: Nov. 14, 1972

[21] Appl. No.: 306,413

[52] U.S. Cl. .................... 360/106, 360/92, 360/109
[51] Int. Cl. ..................... G11b 21/08, G11b 21/24
[58] Field of Search ........... 179/100.2 CA, 100.2 Z, 179/100.2 MD; 274/4 A, 4 F, 11 A

[56] References Cited

UNITED STATES PATENTS

| | | | |
|---|---|---|---|
| 3,083,269 | 3/1963 | Gaubert | 179/100.2 Z |
| 3,109,898 | 11/1963 | Gray | 179/100.2 MD |
| 3,247,328 | 4/1966 | Mitchell et al. | 179/100.2 Z |
| 3,372,937 | 3/1968 | Flint | 179/100.2 CA |
| 3,440,359 | 4/1969 | Page et al. | 179/100.2 CA |
| 3,455,559 | 7/1969 | Wilson | 179/100.2 CA |

*Primary Examiner*—Bernard Konick
*Assistant Examiner*—Robert S. Tupper
*Attorney, Agent, or Firm*—Eugene M. Whitacre

[57] ABSTRACT

A magnetic head assembly cooperates with a tape cartridge player of the type adapted to play a plurality of tape cartridges supported in a stacked array and of the type wherein the tape contained within each of the cartridges includes laterally spaced magnetic information tracks. The assembly includes a mounting plate supported for sequential movement between a first position and one or more further positions. The plate supports a plurality of transducing means each adapted to cooperate with a different one of the plurality of tape cartridges. Each transducing means is positioned to operatively engage one of the laterally spaced magnetic information tracks of the tape contained within its associated tape cartridge when the mounting plate is in the first position. When the mounting plate is moved to a further position, each of the plurality of transducing means is positioned to operatively engage another of the laterally spaced magnetic information tracks.

7 Claims, 9 Drawing Figures

APPARATUS FOR PROVIDING INDIVIDUAL ADJUSTMENT OF MOVABLE MULTIPLE TRANSDUCERS IN A PLURAL TAPE CARTRIDGE PLAYER

The present invention pertains to a tape cartridge player magnetic head assembly, and more particularly, to a mechanism for positioning a plurality of magnetic heads with respect to the magnetic tape contained within a plurality of tape cartridges.

In many tape cartridges, a plurality of magnetic tracks are often provided on the magnetic tape, the tracks being laterally offset from each other. The tracks are longitudinal and are parallel to one edge of the tape. A magnetic head engageable with the tape may have more than one head unit or magnetic gap to enable more than one magnetic track to be simultaneously scanned. To minimize the number of magnetic head units, it has been common practice to mechanically laterally shift the magnetic head with respect to the tape to successively bring the head units into scanning relationship with different ones of the magnetic tracks. Mechanisms of this type have the advantage of requiring fewer head units for a given number of magnetic tracks than would be required with a stationary head having an equal number of head units as the tracks to be played. However, the magnetic head shifting mechanism must accurately position each of the head units with respect to the magnetic tracks of the tape to be played in both height (lateral relationship with respect to the magnetic tracks of the tape) and azimuth (angular relationship with respect to the magnetic tracks of the tape).

The problem in accurately shifting the magnetic head and providing accurate height and azimuth relationship with a tape to be played is compounded by the desirability for simplifying height and azimuth adjustments for each of the heads while providing a reliable head shifting assembly which requires a minimum amount of labor to fabricate. Because of the plurality of magnetic heads, the assembly must provide easy access to each magnetic head within the assembly to allow independent height and azimuth adjustment in a manner which does not affect the adjustment of the other magnetic heads.

An assembly embodying the present invention is incorporated in a tape cartridge player of the type adapted to play a plurality of tape cartridges. The cartridges are supported in a stacked array and are of the type wherein the tape contained within each of the cartridges includes laterally spaced magnetic information tracks. The assembly includes a mounting plate movably supported. The mounting plate is movable between at least a first and a second position in a direction transverse to the direction of extension of the laterally spaced magnetic information tracks of the tape contained within each of the plurality of tape cartridges in the stacked array. A plurality of transducing means are supported on the mounting plate. Each of the plurality of transducing means is adapted to cooperate with the tape of a different one of the plurality of tape cartridges and positioned to operatively engage one of the laterally spaced magnetic information tracks of the tape contained within its associated tape cartridge when the mounting plate is in a first position. Each of the plurality of transducing means is further positioned to operatively engage another of the laterally spaced magnetic information tracks of the tape contained within the associated tape cartridge when the mounting plate is in the second position.

A complete understanding of the invention may be obtained from the following detailed description of a specific embodiment thereof, when taken in conjunction with the accompanying drawings, in which.

Figure 1:
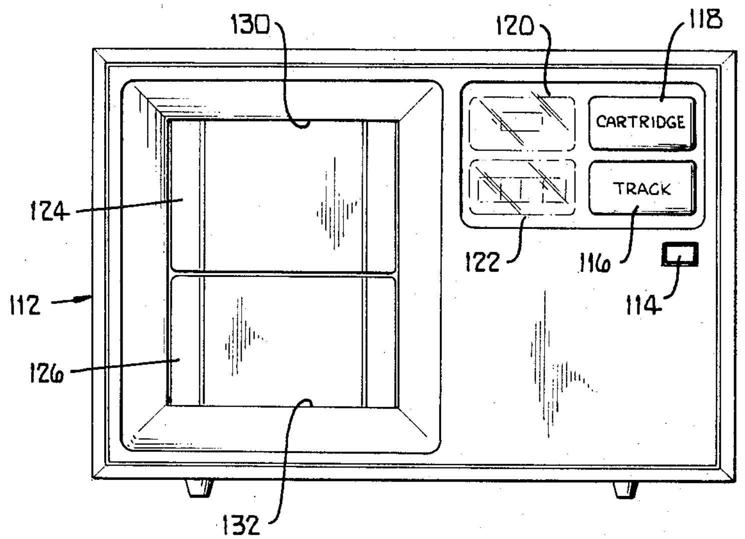
FIG. 1 is a front elevation view of a tape cartridge magazine type tape cartridge changer embodying the present invention.

Reference is now made to FIGS. 1–9 wherein like reference numerals are utilized to designate similar elements in the various FIGURES. A tape cartridge changer is housed within a cabinet assembly 112. The changer is adapted to play endless loop tape cartridges. One such cartridge (often termed the "Stereo-8" type tape cartridge) incorporates a rotatable core and platform assembly around which is wound an endless loop of magnetic tape. As the core and platform assembly is rotated, the innermost convolution of tape adjacent the core is pulled out from the tape pack and passed across openings in the forward portion of the tape cartridge housing and around a pressure roller. Thereafter, the tape is wound around the outermost convolution of the tape.

The tape cartridge player includes an ON-OFF control 114, a track control 116, and a cartridge control 118. The front panel of the cabinet includes an indicator 120 for indicating the particular one of the plurality of tape cartridges which is being played and an indicator 122 for indicating the particular set of magnetic tracks being played of the selected cartridge. The tape player cabinet 112 additionally includes two doors 124 and 126 adapted to permit insertion of a tape cartridge magazine 128 into operative engagement with the tape changer operating mechanisms. The door 124 is hinged at an upper cabinet surface 130 and the door 126 is hinged at a lower cabinet surface 132. The doors 124 and 126 are spring biased closed (as shown in FIG. 1) and are deflected inward, toward the tape changer operating mechanism, when the tape cartridge magazine 128 is inserted through the doors into the changer.

The tape cartridge magazine 128 includes a top surface 134 and a bottom surface 136 which are maintained in fixed spaced relationship by the side members 138 and 140. The top, bottom and side members define an enclosure having a front opening 142 and a rear opening 144. A translucent cover 146 is detachably secured to close the enclosure rear opening 144. The cover 146 is attached to the tape cartridge magazine 128 by means of yieldable arms 148 and 150 which engage cooperating ribs, not shown, in the cartridge magazine sides 138 and 140.

With the cover 146 removed, tape cartridges are loaded into the magazine 128 through the enclosure rear opening 144. The cartridges are supported within the magazine enclosure by a plurality of rails 152 attached to the magazine side 140 which cooperate with a corresponding plurality of rails 154 attached to the magazine side 138. Corresponding rails on the magazine sides 138 and 140 cooperate to support different ones of the tape cartridges inserted within the magazine enclosure in a vertically stacked array. The lowermost cartridge of the array is supported by the magazine bottom surface 136.

The front opening 142 of the magazine is smaller than the rear opening 144 of the magazine to prevent tape cartridges supported within the enclosure from being expelled through the magazine front opening. The magazine side members 138 and 140 have respective portions 156 and 158 which are sloped toward each other to reduce the size of the magazine front opening. A plurality of fingers 159 are additionally attached to the side portion 158 which in conjunction with the portion 157 of the sloped portion 156 insures that the tape cartridges supported within the magazine enclosure cannot be forced against the sloped side portion 156 and 158 and possibly become wedged. It will be noted that the top, bottom and side portions of the magazine generally conform to the shape of the tape cartridges to be played such as tape cartridge 160 (shown in FIGS. 3–7). A plurality of slot shaped openings 162 are provided in the magazine side 138. The openings provide access into the interior portion of the magazine enclosure for the operating portion of the tape changer mechanism utilized to manipulate the tape cartridges supported within the magazine 128 into and out of engagement with the changer capstan 163 and transducer assembly 165.

A low coefficient of friction guide 164 is opposite each of the openings 162 and is supported within the magazine enclosure by the side wall 140. Each guide 164 is fabricated from, for example, Teflon, chrome, metal containing or plated with nickel, or some other material having a low coefficient of friction with the cartridge material. Guide 164 is secured to the side wall 140 by a finger 167 and a further finger member 168 (which are hooked to notched surfaces, not shown, in the enclosure side 140). The guide 164 is disposed closer toward the magazine enclosure front opening 142 than the magazine enclosure rear opening 144 and provides a low friction surface for its associated tape cartridge when the tape cartridge is manipulated by the player operating mechanism to move within the tape cartridge magazine 128. The tape cartridge magazine 128, moreover, includes a detent notch 170 which cooperates with a tape player detent roller 171 (FIG. 3) to secure the magazine in proper operating position within the tape changer cabinet 112 when it is inserted through the cabinet doors 124 and 126.

A notched out front portion 174 is provided to enable sensing means (not shown) associated with the cartridge tape changer to enter the front portion of the magazine and sense the type of tape cartridge contained within the magazine enclosure. Specifically, the notched out front portion 174 enables the player sensing device to detect whether the tape cartridge to be played includes a corresponding notched out portion thereby indicating that the endless loop tape cartridge is of the eight track, four track per program type (often termed a "Quad-8" tape cartridge) as opposed to the eight track, two track per program type cartridge (often termed a "stereo-8" tape cartridge). This is in accordance with the EIA standards set forth in RS–332, published in 1967 by the Electronic Industries Association.

As is most clearly shown in FIG. 3–7, a rotatable cam assembly including shaft 176 is adapted to be driven to rotate by a motor 178 and a gear train 180 mounted beneath the tape player lower support plate 182. The shaft 176 is driven to rotate in a counter-clockwise direction as shown by the arrow 177 in FIG. 7. The shaft 176 supports a plurality of cams 184, 186, 188, 190, 192, 194, and 196. Cams 184, 188, 192, 194 and 196 are part of the changer tape cartridge manipulating mechanism. Cams 186 and 190 cooperate, respectively, with switches 262 and 282 whose function will be described in detail hereinafter.

Figure 4:
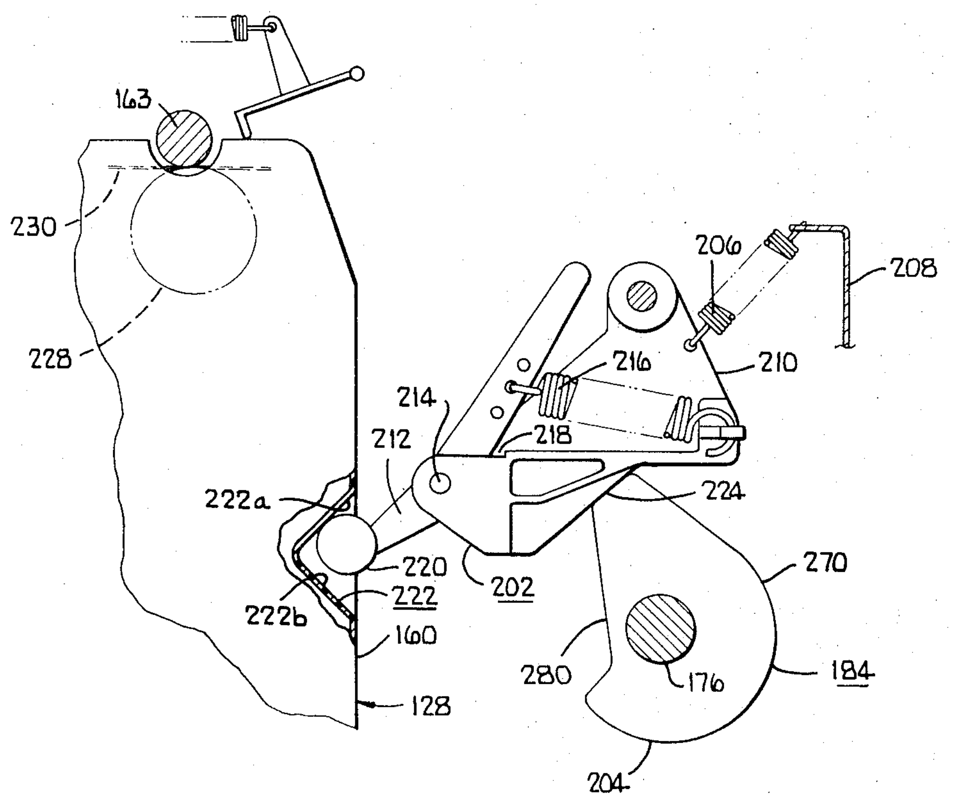
FIGS. 4–6 are enlarged partial top plan views of the cartridge manipulating mechanism with the mechanism shown manipulating a tape cartridge to be in different positions with respect to the changer capstan and head assembly.
Figure 9:
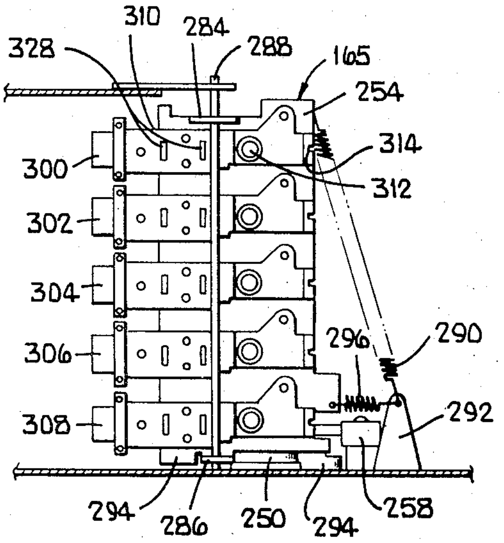
FIG. 9 is a right side view of the tape cartridge changer head assembly shown in FIG. 3.
Figure 5:
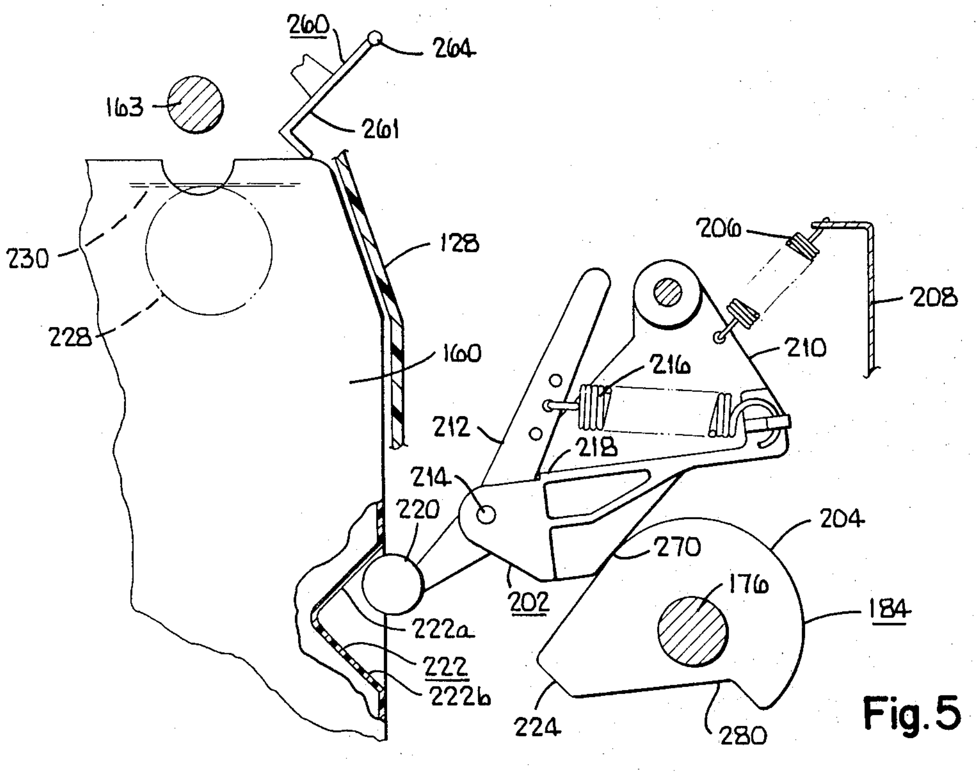
Figure 6:
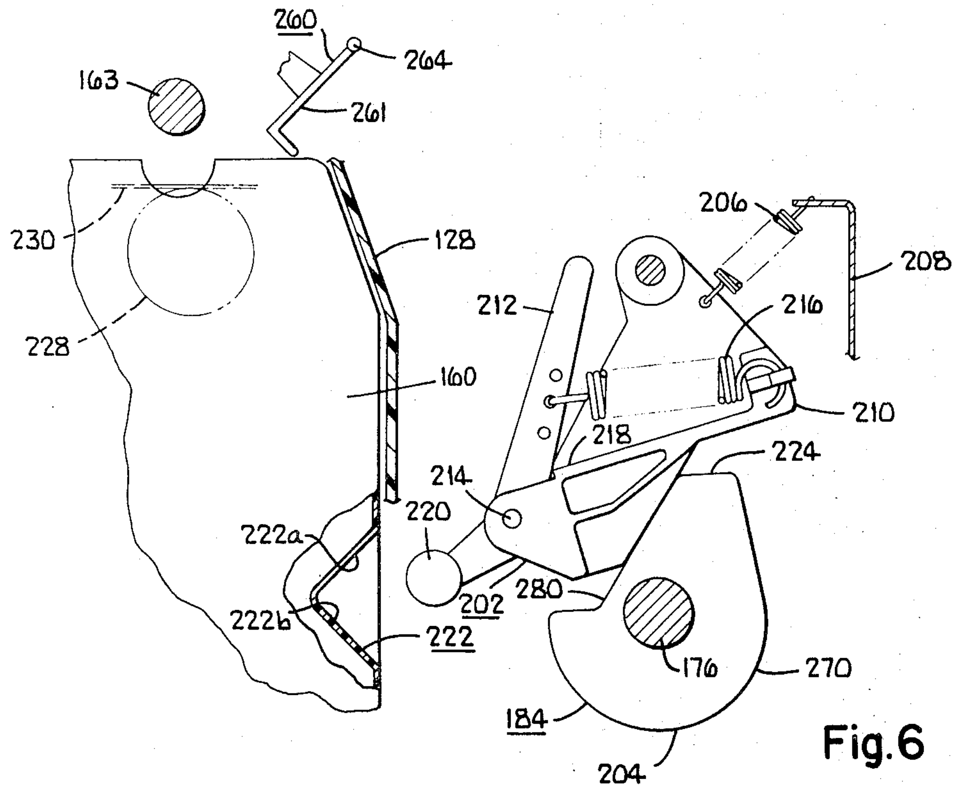

The detailed construction and mode of operation of cam 184 and its cooperating pawl mechanism 202 are shown in the enlarged partial top plan views in FIGS. 4–6. It should be understood that the details of construction, with the exception of the cam surface shape, is identical for each of the plurality of cam and pawl mechanisms within the tape cartridge changer operating mechanism. Consequently, only the detailed construction of cam 184 and its associated pawl mechanism 202 will be discussed in detail.

The cam 184 includes a continuous surface having three portions lying at different radial distances from the center of the rotatable shaft 176. The rotatable shaft 176 is positioned at different angular positions to move its associated pawl mechanism 202 to different positions needed for the manipulation of tape cartridge 160. Specifically, the cam surface portion 204 engages the pawl member 202 which functions as a cam follower. A spring 206 attached between a support bracket 208 and the pawl member 210 urges the pawl member 210 to bear against the cam 184. A second pawl member 212 is pivotally connected to the pawl member 202 and rotates about a pivot 214. The pawl members 210 and 212 are further interconnected by means of a spring 216 which causes the pawl member 212 to rotate in a clockwise direction about its pivot 214. The pawl member 212 is restricted in its clockwise rotation by a shoulder 218 formed as part of the pawl member 202. The pawl member 212 supports a plastic disc 220 which is adapted to engage the detent notch 222 of the tape cartridge 160 housed wihin the magazine 128.

The cam portion 224 of cam surface 204 bears against the pawl member 202 (FIG. 4) to cause the disc member 220 to be positioned within the detent notch 222 and position the tape cartridge 160 in operative engagement with the player capstan 163 and magnetic head assembly 165. It will be noted that the capstan 163 is a long shaft which is mounted between the player upper support plate, not shown, and lower support plate 182. The capstan 163 is belt driven through a flywheel, not shown, coupled to the capstan below the lower support plate 182 and belt 223 driven by the shaft 225 of the motor 226, shown in FIG. 3. The particular amount of force with which the cartridge pressure roller 228 is urged against the player capstan 163, thereby captivating the magnetic tape 230 within the tape cartridge, is determined by the spring 216.

Figure 3:
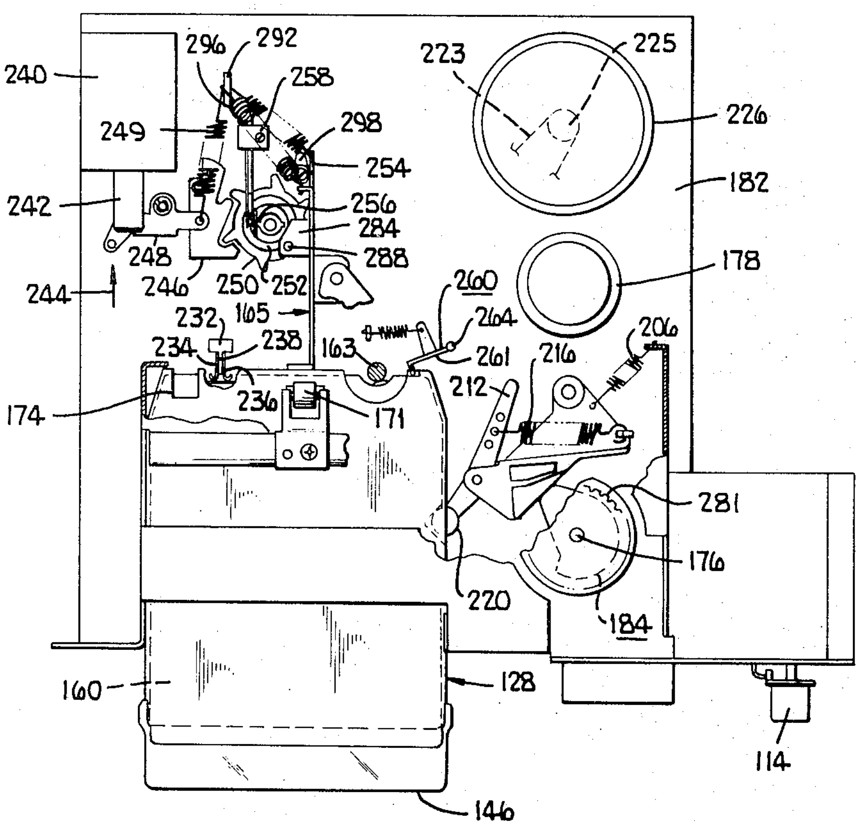
FIG. 3 is a partial top plan view, partly broken away to show details of construction, of portions of the operative mechanism of the tape cartridge changer shown in FIG. 1.
Figure 2:
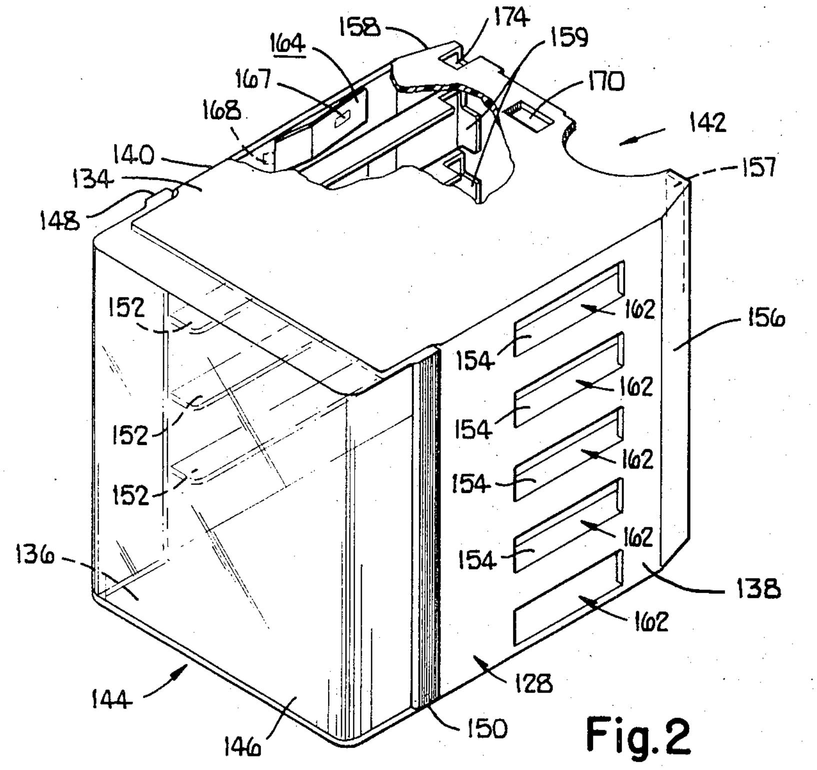
FIG. 2 is a perspective view, partially broken away, of a tape cartridge magazine adapted to be used in conjunction with the tape cartridge changer shown in FIG. 1.
Figure 8:
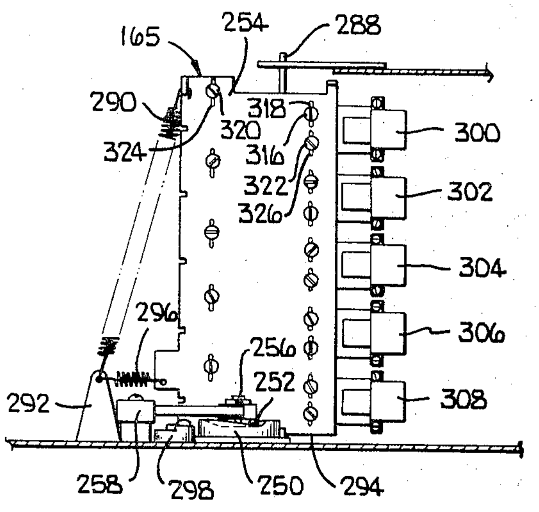
FIG. 8 is a left side view of the tape cartridge changer head assembly shown in FIG. 3.

The magnetic tape within each of the tape cartridges is of the type which includes a conductive foil. Each time the endless loop of tape is completely played, the conductive foil passes a foil sensor 232 which is comprised of two plates 234 and 236 separated by an insulating space 238 (see FIG. 3). The two plates 234 and 236 have a plurality of paired projections, at spaced intervals along the plates 234 and 236, the top ones of which are shown in FIG. 3. The number of paired projections corresponds to the number of tape cartridges adapted to be supported within the tape cartridge magazine 128. Corresponding projections on the foil detector plates 234 and 236 engage the magnetic tape within its associated tape cartridge.

As the conductive foil passes the foil detector 232, the conductive surface completes the electrical path between the detector plate 234 and 236. This actuates a solenoid 240 to cause its plunger 242 to move in the direction of the arrow 244. When this occurs, the head ratchet 246 moves in a direction opposite to the direction of the arrow 244 by virtue of the force transmitted from the plunger 242 through the linkage 248. After the conductive foil passes the detector 232 opening space 238 the solenoid 240 is deactivated. Upon deactivation of solenoid 240, the spring 249 through linkage 248 provides return motion of the plunger 242 and through member 246 causes rotation of cam 250. For example, such revolution of cam 250 may comprise a desired fraction of a revolution. Spring 249 maintains the head ratchet 246 in engagement with the cam 250. As the cam 250 is rotated, the stepped cam surface 252 shifts the head assembly 165 mounting plate 254. The magnetic head assembly 165 will be treated in detailed hereinafter; however, it is sufficient for the present purpose to indicate that the mounting plate 254 is shifted transverse to the laterally spaced longitudinal magnetic information tracks on the tape contained within each of the plurality of tape cartridges. This moves the magnetic units of each of the magnetic heads associated with each of the plurality of tape cartridges to operatively engage different ones of the laterally spaced magnetic tracks.

After all of the tracks of the magnetic tape of the particular cartridge being played have been brought into operative engagement with its associated magnetic head unit, when the foil again completes the circuit between the foil detector plates 234 and 236, the cam 250 rotates such that a stud 256 closes a switch 258. Switch 258 is connected to cause motor 178 to be energized to run and drive the shaft 176 to rotate in a counterclockwise direction. It will be noted that when the motor 178 is energized to run by the action of switch 258, two parallel connected sensing switches 260 and 262 are temporarily bypassed. The sensing switch 260 which cooperates with the cartridge 160 and switch 262 which cooperates with cam member 186 operate in parallel fashion to provide stopping of the motor 178.

The sensing switch 260 includes an L-shaped switch operator 261 which is positioned adjacent the plurality of tape cartridges supported within the tape cartridge magazine 128 when inserted into the tape cartridge changer. The switch operator 261 is manipulated to open the switch 260 by any tape cartridge within the stacked array moved into operative engagement with the player capstan 163 and head assembly 165. The switch operator 261 is pivotally mounted to rotate about a pivot 264 which is substantially parallel to the shaft 176. The motor 178 continues to drive the shaft 176 to rotate through the gear system 180 until a tape cartridge is moved by one of the plurality of pawl mechanisms into operative engagement with the player capstan 163 and transducer assembly 165 such that the front portion of the tape cartridge engages switch operator 261. The switch 260 is opened before the cam 186 opens the parallel connected switch 262. Since both switches must be opened to de-energize motor 178, only cam 186 need be a precision part to insure motor 178 is de-energized at the proper instant to accurately position the shaft 176 and hence the plurality of cams and pawl mechanisms. Motor 178 remains de-energized until the plurality of laterally spaced magnetic tracks on the tape within the next tape cartridge brought into operative engagement with the changer capstan 163 and head assembly 165 has been played. At this time, switch 258 is again actuated and temporarily overrides the sensing switch 260 and 262 to energize the motor 178 to run.

Should a cartridge position within the stacked array of tape cartridges supported within the magazine 128 be left vacant, the pawl mechanism associated with that cartridge position is operated by its associated cam in the manner normally associated with manipulating a tape cartridge. However, since the tape cartridge is absent, the sensing switch 260 is not opened and although the parallel connected motor sensing switch 262 is opened, the motor 178 remains energized and continues to drive the shaft 176. The shaft 176 is driven to rotate until a cam engages an associated pawl mechanism to move the next tape cartridge supported within the stacked array into operative engagement with the player capstan and transducing assembly. This opens the switch 260 and shortly thereafter when the parallel connected switch 262 is opened by cam 186, motor 178 is de-energized.

When the motor 178 is energized to run and causes the shaft 176 to rotate in a counter-clockwise direction, cam surface portion 224 is moved out of engagement with the pawl member 210 and the cam surface portion 270 is moved into engagement with the pawl member 210 (FIG. 5). During the transition period while cam surface portion 224 moves out of engagement with the pawl member 210 and cam surface portion 270 moves into engagement with the pawl member 210, the entire pawl mechanism 202 rotates under the action of spring 206 in a counter-clockwise direction while bearing against the cam 184. This brings the disc 220 which may be rotatable into engagement with the rear wall 222*b* of the tape cartridge detent notch 222 and moves the tape cartridge 160 to a new position within the tape cartridge magazine 128. The tape cartridge 160 (FIG. 5) is maintained in a fixed position within the cartridge magazine 128 wherein the pressure roller 228 is out of engagement with the changer capstan 163 and the magnetic tape 230 is out of engagement with the changer head assembly 165. The cartridge 160 while in this position is detented within the tape cartridge magazine 128. Even if the magazine rear cover 146 is removed and the changer tilted, cartridge 160 will be retained in proper position with the disc 220 bearing against the cartridge detent notch front wall 222*a* (FIG. 5). Further, it is to be noted that when a given cartridge is in the playing position as shown and described with respect to FIG. 4, at the same time any remaining cartridges in the magazine 128 are disposed in the detented position shown and described with respect to FIG. 5. Thus, it will be understood that the changer system is operable even if the magazine rear cover 146 is not present and the changer tilted.

The shaft 176 is rotated during manipulation of each of the remaining tape cartridges 272, 274, 276 and 278 within the tape magazine 128 until the cam portion 280 engages the pawl member 210 (FIG. 6). In this position, the disc 220 is totally disengaged with the tape cartridge notch 222 and is withdrawn from the associated magazine access slot 162. It will be noted that each of the cams 184, 188, 192, 194 and 196 include a cam surface portion similar to cam surface portion 280 associated with cam 184. These cam surface portions are vertically aligned such that all of the pawl mechanisms 202, 203, 205, 207 and 209 are simultaneously moved out of engagement with the detent notch of their associated tape cartridge and away from the tape cartridge magazine 128. This allows the tape cartridge magazine 128 to be withdrawn from the tape player cabinet 112 without being obstructed by portions of the tape cartridge moving mechanism.

Figure 7:
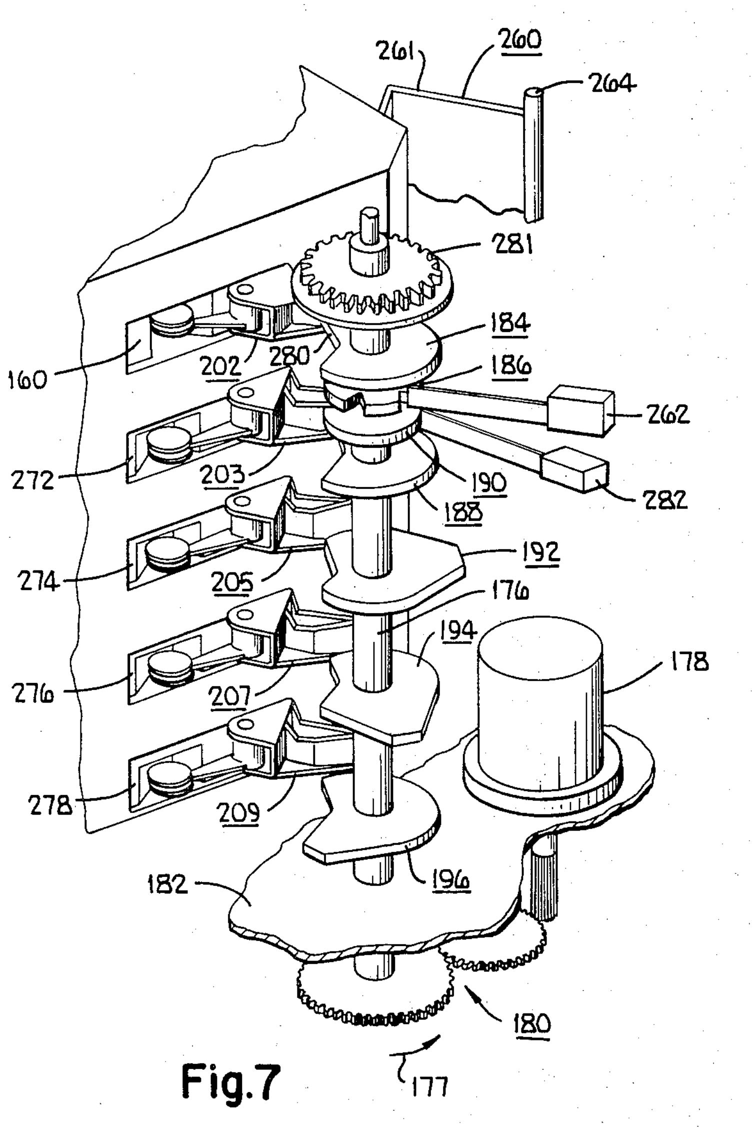
FIG. 7 is a partial perspective view of the tape cartridge manipulating mechanism shown in FIGS. 3–6.

It will be recognized that each of the cams 184, 188, 192, 194 and 196 are differently shaped to have cam surface portions corresponding to cam surface portions 224 of cam 184 positioned in a circular pattern as seen in FIG. 7 taken with FIGS. 5 and 6 which show the shaft 176 and the plurality of cams. This causes sequential operation of each of the tape cartridges within the magazine 128 by moving the pawl mechanisms in a sequential order. The pawl mechanisms are all each first moved from the load position where all the pawls are totally disengaged with the detent notch of each of the plurality of tape cartridges and are withdrawn from the tape cartridge magazine (similar to pawl mechanism 202 as shown in FIG. 6) into a position where the pawl mechanisms 202, 203, 205, 207 and 209 engage the detent notch of their associated tape cartridge to maintain their associated tape cartridge in a ready position. In this position, the tape cartridges within the magazine are maintained in a fixed position spaced apart from the changer capstan 163 and changer magnetic head assembly 165 (similar to the pawl mechanism 202 as shown in FIG. 5). The topmost tape cartridge 160 in the stacked array of tape cartridges, however, is moved into the play position by its associated pawl mechanism 202, being brought into operative engagement with the changer capstan 163 and changer magnetic head assembly 165. As previously described, when the tape tracks have been completely played, the tape cartridge 160 is moved by the pawl mechanism 202 back to the ready position and the next tape cartridge 272 within the stacked array is moved under the action of its associated pawl mechanism from its ready position of the play position. The sequence continues with cartridges 274, 276, and 278 being played, whereupon the rotatable shaft is moved to position the cam surface portion of each of the plurality of cams 184, 188, 192, 194 and 196 to the load position.

A gear 281 is mounted to the shaft 176. The gear 281 drives an indicator drum mounted behind the indicator window 120 to rotate and indicate the particular tape cartridge being played. The remaining cam 190 mounted to the shaft 176 controls a switch 282. Switch 282 functions to keep AC power applied to the changer should the ON-OFF switch 114 be turned off while the changer tape cartridge manipulating mechanism is engaged with a tape cartridge. The AC power is kept on until the shaft 176 is positioned to cause the changer tape cartridge manipulating mechanism to be in the load position. At this time, the operator for switch 282 falls into a notch in cam 190 and the switch opens thereby de-energizing the tape changer.

Referring again to the magnetic head assembly 165, the mounting plate 254 includes two ears 284 and 286 which pivotally mount the mounting plate 254 to a vertical pivot shaft 288. Vertical pivot shaft 288 is substantially parallel to the player capstan 163. Sufficient clearance is left such that the cam 250 can move the mounting plate 254 in a direction transverse to the laterally spaced magnetic tape tracks. A spring 290 is coupled between the mounting plate 254 and a support bracket 292 to urge the edge 294 of the mounting plate 254 to bear against the cam 250. A second spring 296 is also coupled between the mounting plate 254 and the bracket 292. The spring 296 causes the mounting plate 254 to rotate about its pivot 288 and bear against a locating member 298 to provide proper orientation for the mounting plate and also bias out clearance between the holes in the ears and the shaft 288 to maintain a constant azimuth of the mounting plate 254 without precision parts.

A plurality of magnetic heads 300, 302, 304, 306 and 308 are preferably selectively connected to an amplifier through a rotary switch on shaft 176 both of which are not shown, and are each mounted by screw members to a support arm. The support arms are identical and only support arm 310 for magnetic head 300 will be described in detail. The support arm 310 is pivotally mounted to the mounting plate 254 to rotate about the pivot 312. The axis of the pivot 312 is normal to the major surfaces of the mounting plate 254. A cutout notch 314 is provided in the rear edge of the support arm 310 and the mounting plate 254 to allow the support arm 310 to be pivoted about the pivot 312 from its rear edge, as for example by use of a screwdriver blade. This adjustment provides a height adjustment for the magnetic head 300 mounted to the support arm 310. It will be noted that individual height adjustments are provided in a like manner for the magnetic heads 302, 304, 306 and 308. The height adjustment assures that the magnetic head units within the magnetic heads are properly aligned with respect to the laterally spaced magnetic tracks of the tape contained within their associated tape cartridge supported within the tape cartridge magazine 128. A screw 320 passing through a slot 324 in mounting plate 254 is tightened and may be glued to maintain the height adjustment for the support arm 310, once made.

Azimuth adjustment for the magnetic head 300, that is, pivotal motion around an axis which is substantially parallel to the major surfaces of the mounting plate 254, is accomplished by adjusting screws 316 and 322 which respectively pass through slots 318 and 326 in the mounting plate 254 and engage the head support arm 310. The screws 316 and 322 are operated in a manner to cause the support arm 310 to rotate about a pivot. As shown, the pivot comprises dimple pairs 328 in the support arm 310 which bears against the mounting plate 254. Once the proper adjustment is made, the screws 316 and 322 may be glued in position. It will be noted that the head assembly 165 provides a plurality of magnetic heads, each of which is adapted to engage a different tape cartridge and contains a plurality of magnetic units. Each of the magnetic heads is independently adjustable for both height and azimuth to insure proper engagement with its associated magnetic tape. The height adjustment is made from a rear edge of the mounting plate 254 and the azimuth adjustment is made from the side of the mounting plate. Consequently, both height and azimuth adjustments are made from readily accessible areas of the tape cartridge changer.

What is claimed is:

1. In a tape cartridge player of the type for playing in turn desired ones of a plurality of tape cartridges supported in a stacked array and of the type wherein the tape contained within each of the cartridges includes laterally spaced magnetic information tracks, an assembly comprising:

a mounting plate;

support means for movably supporting said mounting plate, means for moving said mounting plate between a first and a second position in a direction transverse to the laterally spaced magnetic information tracks of the tape contained in each of said plurality of tape cartridges;

a plurality of transducing means supported on said mounting plate, each of said plurality of transducing means spaced to cooperate with the tape of a different one of said plurality of tape cartridges;

adjustment means mounting each of said transducing means for independent movement with respect to said mounting plate; and each of said plurality of transducing means positioned to operatively engage one of said laterally spaced magnetic information tracks of the tape contained within its associated tape cartridge when said mounting plate is in said first position and positioned to operatively engage another of said laterally spaced magnetic information tracks of the tape contained within said associated tape cartridge when said mounting plate is in said second position.

2. An assembly as defined in claim 1 wherein said adjustment means includes height adjustment means mounting each of said transducing means for independent movement in a direction transverse to the lateral spaced magnetic information tracks of the tape contained within its associated tape cartridge.

3. An assembly as defined in claim 1 wherein each of said adjustment means includes height adjustment means mounting each of said transducing means for independent movement in a direction transverse to the laterally spaced magnetic information tracks of the tape contained within its associated tape cartridge and azimuth adjustment means mounting each of said transducer means for angular rotation with respect to the laterally spaced magnetic information tracks of the tape contained within its associated tape cartridge.

4. An assembly as defined in claim 1 wherein said support means includes a cam member engaging said mounting plate and having at least a first cam portion for positioning said mounting plate in said first position and a second cam portion for positioning said mounting plate in said second position, and a first spring member connected to said mounting plate and urging said mounting plate against said cam member.

5. An assembly as defined in claim 4 wherein said support means additionally includes means mounting said mounting plate for rotation about an axis transverse to the laterally spaced magnetic information tracks of the tape contained in each of said tape cartridges and including a second spring member for biasing said mounting plate against a locating member to provide rotational orientation for said mounting plate.

6. In a tape cartridge player of the type for playing in turn desired ones of a plurality of tape cartridges supported in a stacked array and of the type wherein the tape contained within each of the cartridges includes laterally spaced magnetic information tracks, an assembly comprising:

a mounting plate having a pair of major surfaces substantially transverse to the direction of extent of said information tracks;

support means for movably supporting said mounting plate, means or moving said mounting plate between a first and a second position in a direction transverse to the lateral spaced magnetic information tracks of the tape contained in each of said plurality of tape cartridges;

a plurality of transducing means each spaced to cooperate with the tape of a different one of said plurality of tape cartridges;

means for rotatably mounting each of said plurality of transducing means on said mounting plate to enable each of said plurality of transducing means to be rotatable about an axis normal to said mounting plate major surfaces to provide a height adjustment; and each of said plurality of transducing means positioned to operatively engage one of said laterally spaced magnetic information tracks of the tape contained within its associated tape cartridge when said mounting plate is in said first position and positioned to operatively engage another of said laterally spaced magnetic information tracks of the tape contained within said associated tape cartridge when said mounting plate is in said second position.

7. An assembly as defined in claim 6 wherein said mounting means for mounting each of said plurality of transducing means on said mounting plate includes means enabling each of said plurality of transducer means to be rotatable about an axis parallel to said mounting plate major surfaces to provide an azimuth adjustment.

* * * * *